W. L. MIGGETT.
AUTOMOBILE.
APPLICATION FILED JUNE 3, 1912. RENEWED OCT. 8, 1919.

1,409,749.

Patented Mar. 14, 1922.
3 SHEETS—SHEET 1.

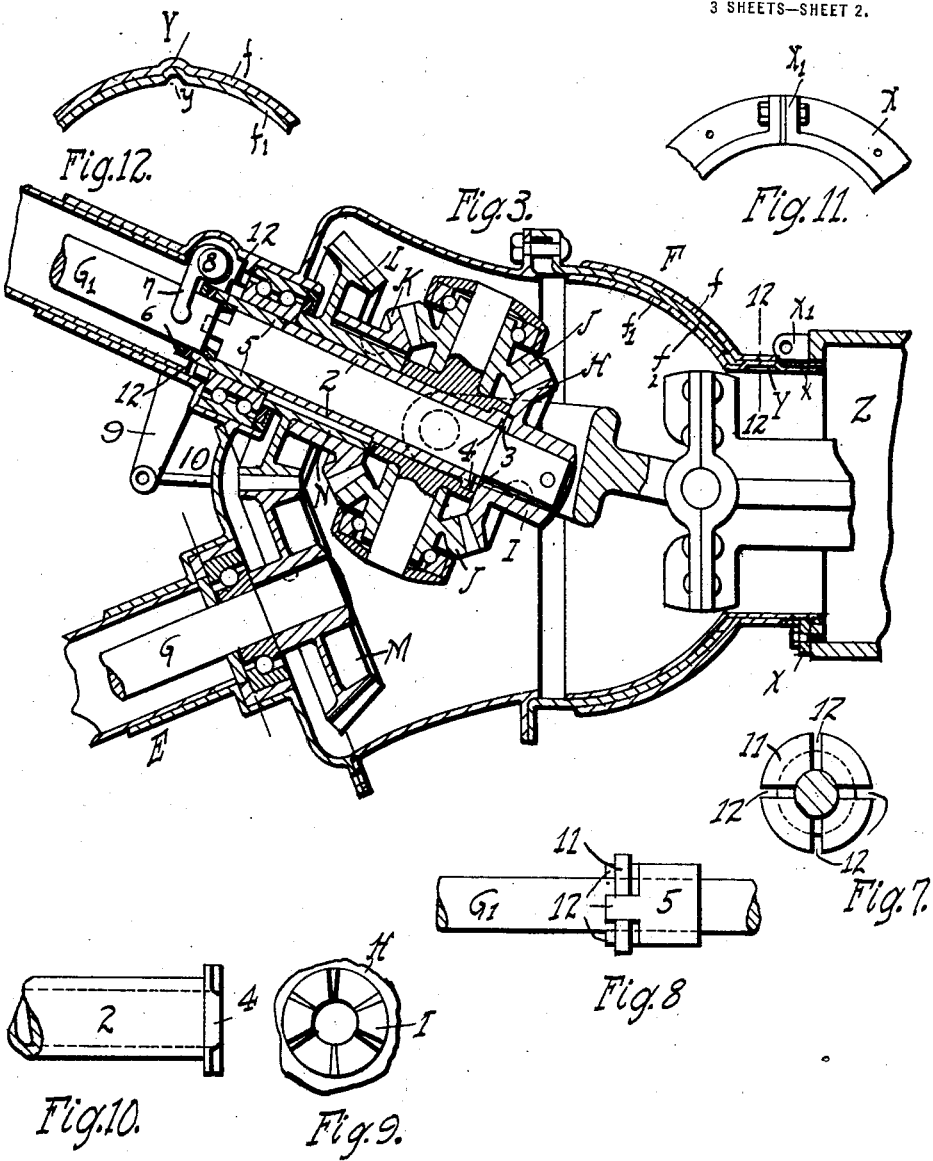

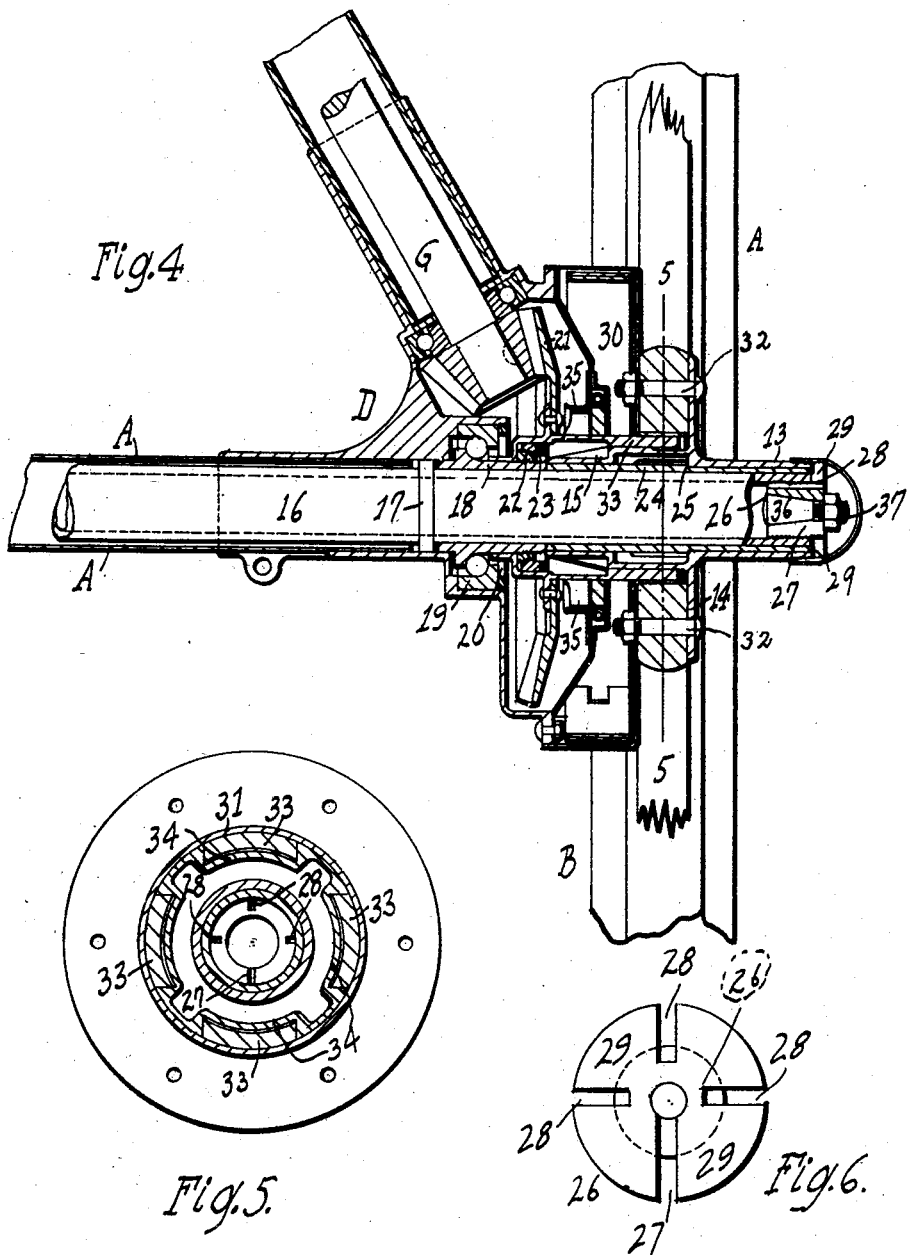

UNITED STATES PATENT OFFICE.

WILLIAM L. MIGGETT, OF DETROIT, MICHIGAN.

AUTOMOBILE.

1,409,749. Specification of Letters Patent. Patented Mar. 14, 1922.

Application filed June 3, 1912, Serial No. 701,147. Renewed October 8, 1919. Serial No. 329,411.

*To all whom it may concern:*

Be it known that I, WILLIAM L. MIGGETT, a citizen of the United States, residing at Ann Arbor, county of Washtenaw, State of Michigan, have invented a certain new and useful Improvement in Automobiles, and declare the following to be a full, clear, and exact description of the same, such as will enable others skilled in the art to which it pertains to make and use the same, reference being had to the accompanying drawings, which form a part of this specification.

My invention relates to automobiles and an object of my improvements is to provide an improved construction of the kind of automobiles shown in my United States Patents Nos. 1,005,863 and 1,010,166.

In the accompanying drawings:

Figure 3, is a sectional view of the connecting mechanism between the diverging shafts and the casing for such mechanism.

Figure 4, is a horizontal section of the hub and adjacent parts.

Figure 5, is a section on the line 5—5 Fig. 4, looking from the left of said line.

Figure 6, is an end view of the nut 26 showing the outer end of said nut.

Figure 2:
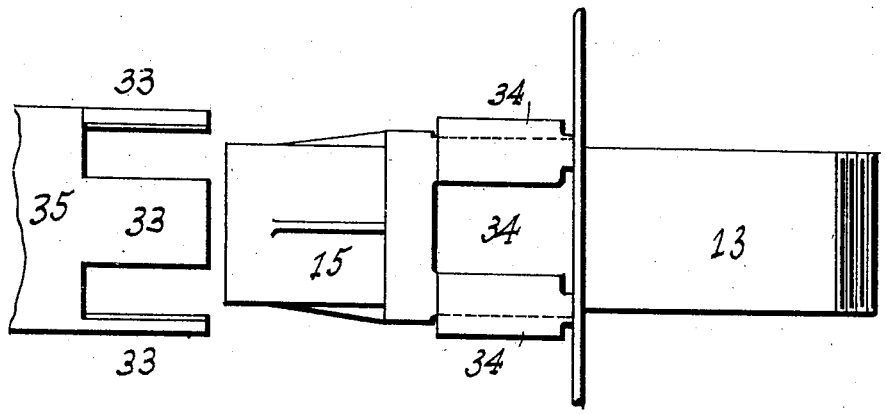
Figure 2, is a plan view of the hub separated from the rest of the vehicle with an adjacent portion that unites with the hub when the latter is adjusted to place.
Figure 1:
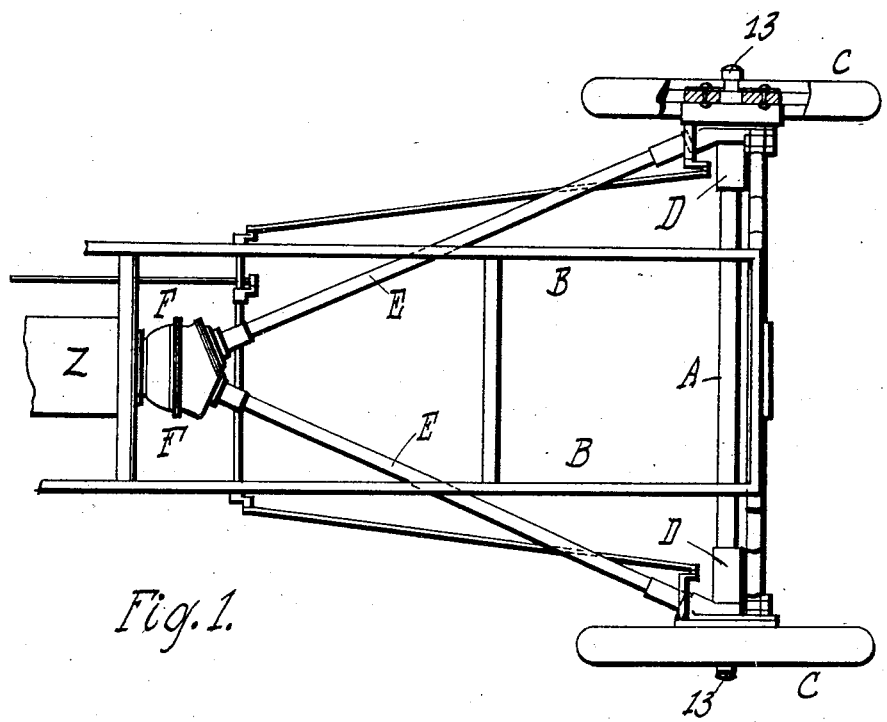
Figure 1, is a plan view of an apparatus embodying my invention and so much of an automobile as is necessary to illustrate the connection of my invention therewith.

Figure 7, is a detail view showing the shaft $G^1$ in cross section and showing the flange or rib 11 with its slots and the teeth 12 of the sleeve 2 passing through said slots.

Figure 8, is a side view of the parts shown in Figure 7.

Figure 9, is a detail view showing the clutch face 3 on the hub I of the gear wheel H.

Figure 10, is a side elevation of an end of the sleeve 2.

Figure 11, shows a part of the ring X.

Figure 12, is a detail section on the line 12—12 Fig. 3.

A, indicates a tubular casing. B B indicates the frame of an automobile. C C, are the rear, or driving wheels. D D, are the casings at the ends of the casing A containing the bearing for the transmission shafts $G^1$ G, and the various parts for driving and assembling the wheels. E E, are the casings for the transmission shafts $G^1$ G. These casings unite with the casings D D at their rear ends and converge toward each other toward the front of the vehicle, and are united by the casing F F, which encloses the equalizing gear and parts connecting the transmission shafts $G^1$ G.

H, is a bevel gear wheel having a hub I secured upon a shaft $G^1$. J J are the planetary gear wheels of the equalizing gear. K, is a bevel gear wheel pivoted to turn around and concentric with the shaft $G^1$, its teeth engaging the teeth of the gear wheels J J. L, is a gear wheel united with the gear wheel K so as to turn therewith, its teeth engaging the teeth of a wheel M on the other transmission shaft G.

2, is a sleeve upon a transmission shaft $G^1$. The hub N of the gear wheel L is keyed to the sleeve 2 so as to slide longitudinally thereof but to be restrained from angular motion relative thereto. 3, is a clutch face on the hub I of the gear wheel H. 4, is a clutch face on the sleeve 2 adapted to engage with the clutch face 3 when the sleeve 2 is pushed forward in position for such engagement. The clutch jaws are made tapering on their engaging surfaces so they will automatically disengage when the engaging pressure is removed. 5, is a sleeve having teeth 12 passing through slots in an annular flange 11 on the shaft $G^1$. 6, indicates washers around the shaft $G^1$ and bearing against the outer ends of the teeth 12. 7, is an arm of which there are two, one upon each side of the shaft $G^1$, their outer ends bearing against the washers 6. The arms 7 are fast upon a shaft 8, which may be turned by means of the lever arm 9 and connecting rod 10. By turning the shaft 8 by means of the lever arm 9, the arm 7 presses upon the washers 6, which act against the outer ends of the teeth 12 pushing the sleeve 5 inward to force the sleeve 2 along and into engagement with the hub I of the gear wheel H. In this position the sleeve 2 is united with the gear wheel H by the clutch faces 3 and 4, which connects the gear wheels H, K and L together so that the parts of the equalizing gear are locked and the two transmission shafts G and $G^1$ are constrained to move together with the same angular velocity.

The construction is the same as both ends of the axle and will be described but once.

13, is the outer thimble of the wheel hub. This has a flange 14 by which it is united to the wheel by bolts 32 and to the brake drum 31. 15, is an inward extension of the hub.

16, is a rotating axle in the casing A. 17, is an annular flange or collar, formed upon the shaft 16. 18, is a sleeve carrying a ball race. The sleeve 18 fits upon the axle 16, its inner end coming against a washer interposed between it and the adjacent flange 17. 19, is a ball race secured by a screw threaded ring 20 within the casing D. The ball race upon the sleeve 18 and the ball race 20 with their interposed balls form a bearing for the shaft 16.

24, is a sleeve provided with an annular shoulder 25. The sleeve 24 fits upon the shaft 16, its inner end coming against the washer interposed between it and the adjacent end of the sleeve 18. The hub 13, 15 fits upon the sleeve 24, the inner end of the thimble 13 coming against the shoulder 25.

26, is a split nut having a flange 29. The nut 26 is provided with screw threads which engage screw threads in the inner end of the hollow axle 16. 28, 28, 28 are slots cut radially through the flange 29 of the nut 26 and part way into said nut. There is a conical aperture formed through the nut 26, its large end being inward. 27, is a radial slot passing from the periphery of the flange 29 to the central aperture in said nut. 36, is a conical bolt fitting in the aperture in the nut 26. 37, is a nut engaging the screw threaded outer end of the bolt 36. By screwing the nut 26 into position its flange 29 comes against the outer end of the axle 16, sleeve 24 and thimble 13 holding said parts in position but leaving them free to turn upon the axle 16. By screwing up the nut 37, the nut 26 is expanded so as to fix it firmly in position in the axle 16.

21, is an annular conical gear wheel united to a gear hub 35, which latter is secured upon the sleeve 18 by a split nut 22, its threads engaging threads upon the adjacent end of the sleeve 18, the outer surface of the nut 22 is conical and is screw threaded, its threads being engaged by a screw threaded annulus 23 which fixes the nut 22 firmly in place. The gear hub 35 is provided with teeth or jaws 33 which engage external grooves 34 in the hub 13—15 so as to secure the part 35 to said wheel hub. The cylindrical hub of the brake drum 31 partly encloses the hub and the projecting teeth 33 of the gear hub 35.

Z, is a casing. To this is bolted a split ring, or annulus, X into which is screwed the cylindrical part of the portion $f^1$ of the ball and socket joint. $X^1$, Figs. 3 and 11, indicate ears which are drawn together by a bolt to contract the ring upon the screw threads $x$. The parts are bent up, as indicated at Y Fig. 12, so that the parts $f^1$ and $f$ engage and may not be turned with reference to each other.

A brake is mounted on bosses cast on the casing D and engages the inner surface of the brake drum 31. The frame B B is supported by a spring having its ends attached by means of shackles to the casing D D. By this means the weight of the body of the car is supported by the two ball bearings, one in each casing D D. The tubular casing A serves to keep the casings D D in proper alignment with the axle 16, to keep these casings at the proper distance apart, and to protect the rotating mechanism from dust and dirt.

The two threaded rings 22 23 serve to adjust the mesh of the gear 21 with its pinion on shaft G through the medium of the ball bearing and the casing D.

The jaws 33 of the gear hub 35 are made to slide freely in the slots 34 in the wheel hub 13—15. By the means described above the thrust of the gear parallel to the axis of the axle is always resisted by the anti friction or rolling friction bearing upon which the axle rotates in the casing D. The gear 21 and its pinion being thus held in their proper relation through the medium of a single piece, the casing D, the proper mesh and smooth running of the gears cannot be affected by looseness due to wear of other assembled parts.

The two rolling friction bearings by which the axle is mounted in the casings D D are thus made to perform a triple function; first, to carry the weight of the body of the car; second, to resist end thrusts due to swaying of the car, and third, to resist end thrust due to the thrust of the gears.

The mode of operation of the construction shown and described is as follows:—

In the forward or backward travel of the car as a whole, the driving wheel gears and axle rotates as a single unit upon the two rolling friction bearings in the casings D D, for the reason that the friction of the sleeved wheel hubs upon the axle is several times greater than that of the two rolling friction bearings. When, however, the car is traveling in a curved path, the difference in the speed of the two wheels is accomplished by one or both of turning the small amount required upon the sleeved bearings upon and relatively to the axle.

More briefly, all bearing loads and thrusts due to the running of the car are carried by the two highly efficient rolling friction bearings, while the small amount of differential motion is accomplished by the sleeved bearings of the wheels upon the axle.

What I claim is:—

1. The combination of an axle having an annular outwardly extending flange thereon, a sleeve upon said axle limited in its inward movement by said flange, said sleeve being provided with a ball-race, a casing D for supporting the body upon said axle, an annulus provided with a ball-race adapted to form a part of a ball bearing complementary to that on said sleeve, said annulus being fixed in said casing and being adapted to limit the outward movement of said sleeve.

2. The combination of an axle having an annular outwardly extending flange thereon, a sleeve upon said shaft adjacent to said flange, said sleeve being provided with a ball race, a casing D for supporting the body upon the end of said shaft, an annulus provided with a ball race adapted to form the complementary part of a ball bearing to that on said sleeve, said annulus being fixed in said casing, a part 35 surrounding said axle and sleeved upon said sleeve, said part having the driving gear wheel 21 secured thereto, a driving shaft G having gear wheels thereon, adapted to engage the gear wheels on the part 35, for the purpose described.

3. The combination of an axle having an annular outwardly extending flange thereon, a sleeve upon said axle adjacent to said flange, said sleeve being provided with a ball race, a casing D for supporting the body upon the end of said axle, an annulus provided with a ball race adapted to form the complementary part of a ball bearing to that on said sleeve, said annulus being fixed in said casing, a part 35 surrounding said axle and sleeved upon said sleeve, said part having the driving gear wheel 21 secured thereto, a driving shaft G having gear wheels thereon, adapted to engage the gear wheels on the part 35, the outer end of said sleeve being screw threaded, a nut 22 engaging said screw threads and adapted to hold the part 35 in position on said sleeve.

4. The combination of an axle having an annular outwardly extending flange thereon, a sleeve upon said axle adjacent to said flange, said sleeve being provided with a ball race, a casing D for supporting the body upon the end of said axle, an annulus provided with a ball race adapted to form the complementary part of a ball bearing, a part 35 surrounding said axle and sleeved upon said sleeve, said part having the driving gear wheel 21 secured thereto, a driving shaft G having gear wheels thereon adapted to engage the gear wheels on the part 35, the outer end of said sleeve being screw threaded, a split ring 22 having internal threads engaging the threads on said sleeve, said ring being adapted to hold the part 35 in position, said ring having screw threaded conical exterior surface and a screw annulus adapted to engage the exterior threads on said ring for the purpose described.

5. The combination of an axle having an annular outwardly extending flange thereon, a sleeve on said axle abutting against said flange at its inner end, a wheel hub bearing upon said axle its inner end abutting against the outer end of said sleeve, and means for holding said hub against the outward movement on said axle, a part 35 carrying the gear wheel 21 sleeved upon said sleeve, said hub being provided with exterior grooves 34 extending in the direction of said axle, the part 35 being provided with teeth, or jaws, adapted to engage in said grooves.

6. The combination of an axle having an annular outwardly extending flange thereon, a sleeve on said axle abutting against said flange at its inner end, a wheel hub bearing upon said axle its inner end abutting against the outer end of said sleeve, and means for holding said hub against outward movement on said axle, a part 35 carrying the gear wheel 21 sleeved upon said sleeve, said hub being provided with exterior grooves 34 and extending within the part 35, said grooves extending in the direction of said axle, the part 35 being provided with teeth, or jaws, adapted to engage in said grooves.

7. A vehicle axle having driving wheels sleeved thereon with the inner surface of the sleeve portion contiguous to the outer surface of the axle, and two anti-friction bearings carrying the body of the vehicle, said axle being adapted to turn in said bearings with said wheels by reason of the higher friction of the sleeved wheel journals upon said axle while leaving one of the wheels free to turn relative to the axle to compensate for their difference in speed when the friction between said contiguous surfaces is overcome.

8. A vehicle axle having driving wheels sleeved thereon with the inner surface of the sleeve portion contiguous to the outer surface of the axle, and two anti-friction bearings carrying the body of the vehicle, said axle being adapted to turn in said bearings with said wheels by reason of the higher friction of the sleeve wheel journals upon said axle while leaving one of the wheels free to turn relative to the axle to compensate for their difference in speed when the friction between said contiguous surface is overcome, and means independent of said shaft for driving said wheels.

9. A vehicle axle having driving wheels sleeved thereon with the inner surface of the sleeve portion contiguous to the outer surface of the axle, and two anti-friction bearings carrying the body of the vehicle, said axle being adapted to turn in said bearings with said wheels by reason of the higher friction of the sleeve wheel journals upon said axle while leaving one of the wheels free to turn relative to the axle to compensate for their difference in speed when the friction between said contiguous surface is overcome, and means for driving said wheels with balanced effort on, and differential motion of, the wheels.

10. A motor vehicle axle consisting of a single piece journaled in the hubs of the wheels and normally rotating with them in two antifriction bearings performing the triple function of carrying the load of the vehicle, resisting end thrust due to swaying of the car and body, and resisting the thrust of the driving gears.

11. In combination, a vehicle axle, driving wheels sleeved thereon with the inner surface of the sleeve portion contiguous to the outer surface of the axle, and two antifriction bearings carrying the body of the vehicle, said axle being adapted to turn in said bearings with said wheels by reason of the higher friction of the sleeve wheel journals upon said axle while leaving one or both of the wheels free to turn relative to the axle to compensate for their difference in speed, when the friction between said contiguous surface is overcome, and means for driving said wheels with balanced effort on, and differential motion of, the wheels.

In testimony whereof, I sign this specification in the presence of two witnesses.

WILLIAM L. MIGGETT.

Witnesses:
AGNES M. HIPKINS,
ELLIOTT J. STODDARD.